US012192705B2

(12) United States Patent
Jin et al.

(10) Patent No.: US 12,192,705 B2
(45) Date of Patent: Jan. 7, 2025

(54) HEARING DEVICE WITH FEEDBACK INSTABILITY DETECTOR THAT CHANGES AN ADAPTIVE FILTER

(71) Applicant: STARKEY LABORATORIES, INC., Eden Prairie, MN (US)

(72) Inventors: Wenyu Jin, Eden Prairie, MN (US); Ivo Merks, Eden Prairie, MN (US)

(73) Assignee: STARKEY LABORATORIES, INC., Eden Prairie, MN (US)

( * ) Notice: Subject to any disclaimer, the term of this patent is extended or adjusted under 35 U.S.C. 154(b) by 113 days.

(21) Appl. No.: 17/912,915

(22) PCT Filed: Apr. 6, 2021

(86) PCT No.: PCT/US2021/025886
§ 371 (c)(1),
(2) Date: Sep. 20, 2022

(87) PCT Pub. No.: WO2021/207134
PCT Pub. Date: Oct. 14, 2021

(65) Prior Publication Data
US 2023/0143347 A1 May 11, 2023

Related U.S. Application Data

(60) Provisional application No. 63/007,617, filed on Apr. 9, 2020.

(51) Int. Cl.
*H04R 25/00* (2006.01)
*G10K 11/178* (2006.01)

(52) U.S. Cl.
CPC ..... *H04R 25/453* (2013.01); *G10K 11/17817* (2018.01); *G10K 11/17825* (2018.01); *H04R 25/507* (2013.01)

(58) Field of Classification Search
CPC ...... H04R 25/453; H04R 3/02; H04R 25/505; G10K 11/17825; G10K 11/17854;
(Continued)

(56) References Cited

U.S. PATENT DOCUMENTS 6,377,682 B1 4/2002 Benesty et al.
6,947,549 B2 9/2005 Yiu et al.
(Continued)

FOREIGN PATENT DOCUMENTS

EP 2071875 6/2011
EP 2439958 6/2013
(Continued)

OTHER PUBLICATIONS

PCT Search Report and Written Opinion for PCT/US2021/025886 dated Jul. 14, 2021 (16 pages).
Cakir et al., "Polyphonic Sound Event Detection Using Multi Label Deep Neural Networks", 7 pages.
(Continued)

*Primary Examiner* — Norman Yu
(74) *Attorney, Agent, or Firm* — Mueting Raasch Group

(57) ABSTRACT

An adaptive feedback canceller of an ear-wearable device has an adaptive foreground filter that inserts a feedback cancellation signal into a digitized input signal to produce an error signal. An instability detector of the device is configured to extract wo or more features from the error signal. The instability detector has a machine learning module that determines instability in the error signal based on the two or more features. The instability module changes the adaptive foreground filter in response to determining the instability. The change causes the adaptive foreground filter to have a faster adaptation to perturbations in the error signal compared to a previously used step size.

19 Claims, 6 Drawing Sheets

(58) Field of Classification Search
CPC ..... G10K 11/17817; G10K 2210/3022; G10K 2210/3038; G10K 2210/3054
USPC .................................... 381/318, 23.1, 56, 74
See application file for complete search history.

(56) References Cited

U.S. PATENT DOCUMENTS

| | | | |
|---|---|---|---|
| 7,650,004 B2 | 1/2010 | Durant | |
| 8,355,794 B2 | 1/2013 | Lineaweaver et al. | |
| 10,492,008 B2 | 11/2019 | Xu et al. | |
| 2012/0087509 A1* | 4/2012 | Elmedyb | H04R 3/02 381/71.11 |
| 2015/0189450 A1 | 7/2015 | Van Der Werf | |
| 2016/0302014 A1 | 10/2016 | Fitz et al. | |
| 2017/0289705 A1* | 10/2017 | Hillbratt | A61N 1/36038 |
| 2017/0311095 A1* | 10/2017 | Fitz | H04R 25/453 |
| 2019/0297433 A1 | 9/2019 | Kuriger et al. | |
| 2020/0053486 A1* | 2/2020 | Jensen | H04R 25/505 |

FOREIGN PATENT DOCUMENTS

| | | | |
|---|---|---|---|
| EP | 3236675 | | 1/2020 |
| WO | WO 00/19605 | * | 4/2000 |
| WO | 2008/051569 | | 5/2008 |

OTHER PUBLICATIONS

Huo et al., "A Robust Transform Domain Echo Canceller Employing a Parallel Filter Structure", ScienceDirect, vol. 86, Issue 12, Dec. 2006, pp. 3752-3760.

Nordholm et al, "Stability-Controlled Hybrid Adaptive Feedback Cancellation Scheme for Hearing Aids", J. Acoust. Soc. Am. 143(1), Jan. 2018, pp. 150-156.

Parascandolo et al., "Recurrent Neural Networks for Polyphonic Sound Event Detection in Real Life Recordings", ICASSP2016, Mar. 20-25, 2016, Shanghai China, 6 pages.

Vega et al., "A New Robust Variable Step-Size NLMS Algorithm", IEEE Transactions on Signal Processing, vol. 56, No. 5, May 2008, 16 pages.

* cited by examiner

HEARING DEVICE WITH FEEDBACK INSTABILITY DETECTOR THAT CHANGES AN ADAPTIVE FILTER

RELATED PATENT APPLICATIONS

This application is a U.S. National Stage application under 35 U.S.C. 371 of PCT Application No. PCT/US2021/025886 filed Apr. 6, 2021, which claims the benefit of U.S. Provisional Application No. 63/007,617, filed Apr. 9, 2020, the entire contents of which are is hereby incorporated by reference.

SUMMARY his application relates generally to ear-level electronic systems and devices, including hearing aids, personal amplification devices, and hearables. In one embodiment, an ear-wearable device includes an input sensor that provides an input signal. The input signal is digitized via circuitry of the ear-wearable device. The device includes an adaptive feedback canceller with an adaptive foreground filter that inserts a feedback cancellation signal into the digitized input signal to produce an error signal. An instability detector of the device is configured to extract two or more features from the error signal. The instability detector includes a machine learning module that determines an instability in the error signal based on the two or more features. The instability module changes a step size of the adaptive foreground filter in response to determining the instability. The changed step size causes the adaptive foreground filter to have a faster adaptation to perturbations in the error signal compared to a previously used step size.

In another embodiment, a method involves extracting two or more features from an error signal of a feedback cancellation loop of an ear-wearable device. The two or more features include a power-level-dependent feature and a power-level-independent feature. The two or more features are input to a machine learning module to determine an instability in the error signal. A step size of an adaptive foreground filter used to cancel feedback in the ear-wearable device is changed in response to determining the instability. The changed step size causes the adaptive foreground filter to have a faster adaptation to perturbations in the error signal compared to a previously used step size In another embodiment, a method involves extracting two or more features from an error signal of a feedback cancellation loop of an ear-wearable device. The two or more features include a power-level-dependent feature and a power-level-independent feature. The two or more features are input to a machine learning module to determine an instability in the error signal. An optimization algorithm of an adaptive foreground filter used to cancel feedback in the ear-wearable device is changed in response to determining the instability. The changed optimization algorithm causes the adaptive foreground filter to have a faster adaptation to perturbations in the error signal compared to a previously used optimization algorithm.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below makes reference to the following figures.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
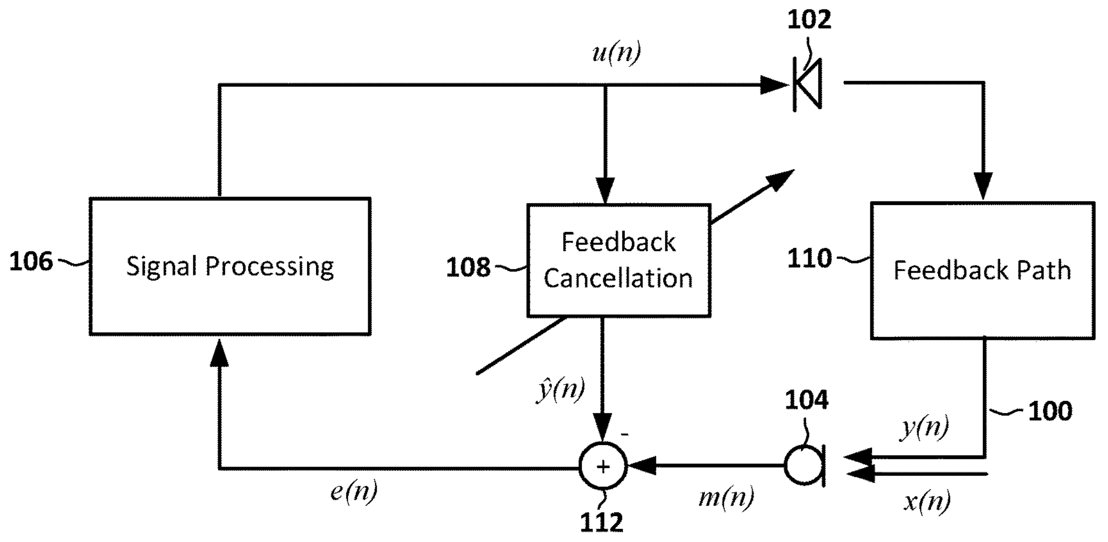
FIG. 1 is a schematic diagram of a hearing device with feedback cancelling according to an example embodiment.

Embodiments disclosed herein are directed to feedback detection in an ear-worn or ear-level electronic device. Such a device may include cochlear implants and bone conduction devices, without departing from the scope of this disclosure. The devices depicted in the figures are intended to demonstrate the subject matter, but not in a limited, exhaustive, or exclusive sense. Ear-worn electronic devices (also referred to herein as "hearing devices" or "ear-wearable devices"), such as hearables (e.g., wearable earphones, ear monitors, and earbuds), hearing aids, hearing instruments, and hearing assistance devices, typically include an enclosure, such as a housing or shell, within which internal components are disposed.

Typical components of a hearing device can include a processor (e.g., a digital signal processor or DSP), memory circuitry, power management and charging circuitry, one or more communication devices (e.g., one or more radios, a near-field magnetic induction (NFMI) device), one or more antennas, one or more microphones, buttons and/or switches, and a receiver/speaker, for example. Hearing devices can incorporate a long-range communication device, such as a Bluetooth® transceiver or other type of radio frequency (RF) transceiver.

The term hearing device of the present disclosure refers to a wide variety of ear-level electronic devices that can aid a person with impaired hearing. The term hearing device also refers to a wide variety of devices that can produce processed sound for persons with normal hearing. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing device" or "ear-wearable device," which are understood to refer to a system comprising a single left ear device, a single right ear device, or a combination of a left ear device and a right ear device.

Embodiments described below utilize adaptive feedback cancellation (FBC), which involves detecting feedback affecting a hearing device. Various FBC systems are widely used and provide benefit for many patients with many devices, such as those popular large vents and open fittings. Perturbations pose challenges to traditional adaptive feedback cancellation algorithms that are based on least squared error (LSE) or mean squared error (MSE). Such perturbations include strong disturbances caused by significant feedback path changes due to user movements/changes of enclosure or environment around hearing devices.

In embodiments described below, the active FBC can be made robust against perturbations due to variations to the incoming signal statistics and feedback path changes. One way to address this problem is to precisely and promptly detect the perturbations due to feedback path change and make the adjustment to a different adaptation rate, e.g., when the feedback path change is detected, the system adapts at a higher rate for a fast re-convergence otherwise the adaptation rate reduces for a steady state with higher added stable gain.

Embodiments described below can improve the overall performance of the adaptive feedback canceler in normal, routine operation. In some embodiments, the adaptive feedback canceller is made robust against perturbations that include strong feedback path changes caused by user movements/changes of enclosure or environment around hearing devices and also variations to its statistics.

In FIG. 1, a schematic diagram shows a feedback cancellation system according to an example embodiment. The system includes a loudspeaker 102 (also referred to as a receiver), a microphone 104, a signal processing circuit 106 (e.g., amplifier, equalizer, noise reduction, etc.) and a feedback canceller 108. In this diagram, x(n) is the incoming signal and y(n) is the feedback signal 100, the latter resulting from a feedback path 110 existing between the speaker 102 and microphone 104. The incoming signal x(n) (which may include impulses, speech, music, noise, etc.) is picked up by the microphone modified by forward signal processing unit, played out through the receiver/loudspeaker as u(n) and then picked up again by the microphone as a feedback signal y(n). There is a delay between the incoming signal onset and when it is picked again as feedback by the microphone 104. This delay is proportional to the forward processing latency and the length of the feedback path 110.

The feedback canceller 108 uses an adaptive filter to generate cancellation signal $\hat{y}(n)$, which is an estimate of the feedback signal and is combined with the microphone signal m(n) at summation block 112. The output of the summation block 112 is error signal m(n), which is ideally close to or the same as the input signal x(n), depending on how well the cancellation signal $\hat{y}(n)$ matches feedback y(n).

When there is a sudden change to the feedback path due to user's physical actions 110 or the statistics of incoming signal x(n), the steady state of the adaptive filtering is undermined, and it needs some time to re-converge. The step size in the adaptive filter update is a trade-off between fast convergence rate/good tracking ability on the one hand and low mis-adjustment on the other hand. In embodiments described herein, the adaptive filter step size can be time-varying to adapt to changing conditions (e.g., instabilities) affecting the feedback cancellation system.

The convergence of typical adaptive filtering algorithms assumes a stable feedback path and stationary input signal. However, this assumption can be difficult to achieve in practice. Many practical scenarios or actions made by users, e.g. user sneezing, standing up and sitting down, phone moving close to the ears, would leads to noticeable changes to the acoustic feedback paths. Additionally, the transition between stationarity periods of the incoming signal leads to outliers in the error signal, resulting in local divergence of the adaptive filter. These perturbations are addressed by the disclosed embodiments.

In one embodiment, a feedback path stability detector controls the step-size of the adaptation as a factor of the update term. The adaptation behavior with variable step size would be: 1) steady state: the error signal e(n) is equal to the source signal x(n) and this means that the step size is 0 as desired. 2) unsteady state: $\sigma e(n)$ is much larger than $\sigma x(n)$. Thus, the step size increases to 1 for fast adaptation which is the desired behavior. A fast reset scheme for the time-variant step-size factor is also devised. The algorithm can switch between a normalized least mean square algorithm (NLMS) and a normalized sign algorithm (NSA). The selection of which algorithm to use depends on an improved stability detector using machine learning.

Figure 2:
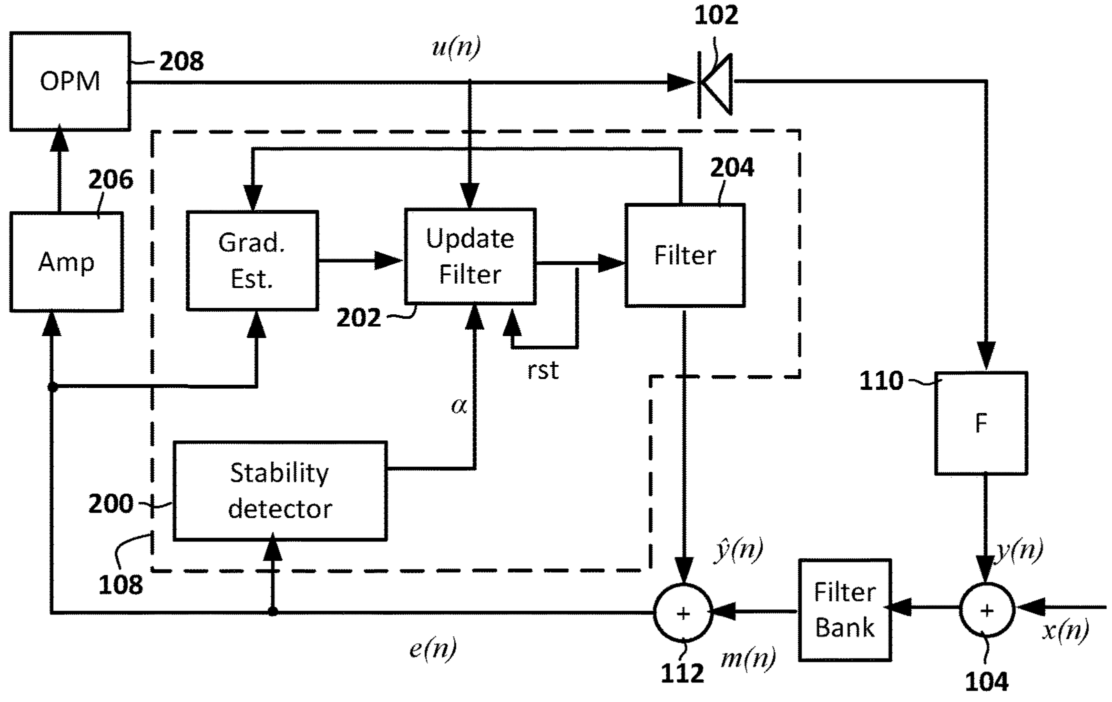
FIG. 2 is a schematic diagram of a feedback canceller according to an example embodiment.

In FIG. 2, a diagram illustrates details of a feedback cancellation circuit 108 according to an example embodiment. The error signal e(n) is input to a stability detector 200 that detects a change in characteristics of the error signal that indicates a change in characteristics of the feedback path 110 that could affect the performance of an adaptive filter 204. The stability detector outputs a value $\alpha$ that, in one embodiment, is a binary value, where 0 indicates a state of stability and 1 indicates a state of instability. The value $\alpha$ is input to an update filter block 202 that changes a step size of the adaptive filter 204 such that the adaptive filter 204 can either converge faster in case of feedback instability, or is more robust in case of feedback stability.

Robustness of the adaptive filter 204 signifies insensitivity to a certain amount of deviations from statistical modeling assumptions due to some outliers. The sensitivity to outliers increases with the convergence speed of the adaptation algorithm and limits the performance of signal processing algorithms, especially when fast convergence is required such as in feedback cancellation. The update filter 202 will allow the adaptive filter 204 to switch between these regimes based on an estimate of instability. Additional features of the adaptive filter will be described further below.

Also seen in FIG. 2 is an amplifier 206 that is part of the signal processing block 106 shown in FIG. 1. An output phase modulator 208 is a component that assists in feedback cancellation by adjusting a phase of the output signal u(n) to avoid or contain entrainment of the adaptive feedback canceller 108. The output phase modulator 208 may work independently of the stability detector 200 and other components of the feedback canceller 108.

Figure 3:
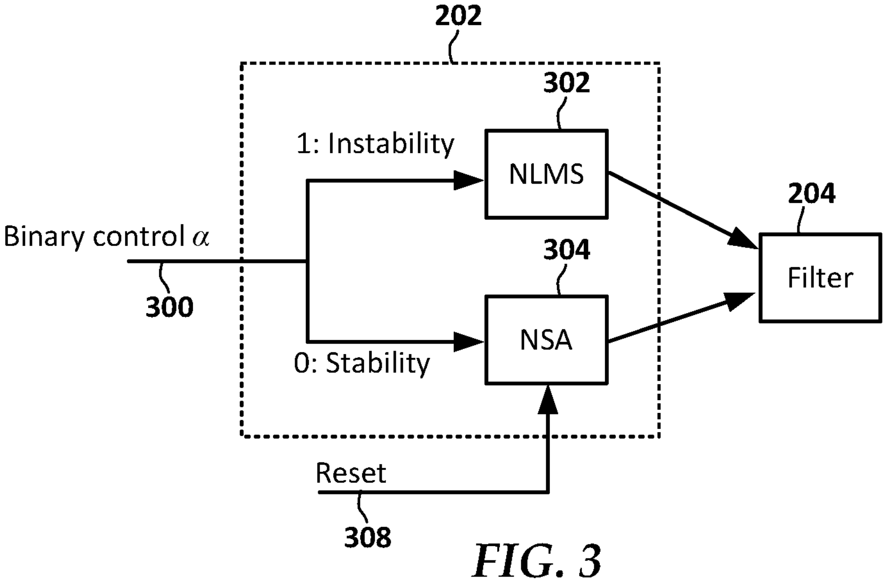
FIG. 3 is a block diagram of a filter updater according to an example embodiment.

In FIG. 3, a diagram shows details of the update filter 202 according to an example embodiment. The stability signal 300 (shown as a in FIG. 2) from the stability detector causes the update filter 202 to change the step size of the adaptive filter 204. As shown in FIG. 3, this this may further involve changing between an optimization algorithm of the adaptive filter 204. In this embodiment, the optimization algorithm is changed from a normalized sign algorithm 304 to a normalized least square algorithm 302 in response to determining the instability. In this case, the instability is communicated by changing the signal 300 to a value of '1.' Note that, while this embodiment may involve changing both step size and algorithm of the adaptive filter 204, changing the step size does not inherently mean changing the algorithm. For example, the NSA algorithm is a variant of NLMS that has a dedicated adaptive thresholding scheme to make sure that the step-size goes smaller if no feedback path change occurs. Thus, it will be understood that descriptions of changing one of the step size or algorithm of the foreground adaptive filter may also be adapted to respectively changing the algorithm or step size instead. Further, descriptions of changing both the algorithm and step size may also be adapted to changing of just one.

After changing the step size of the adaptive filter and/or changing the optimization algorithm, the stability detector determines the error signal has returned to stability, causing signal to revert to a value of '0.' In response thereto, the update filter 208 reverts to a previously used step size of the adaptive filter. The previously used step size results in the adaptive filter having a lower sensitivity to the perturbations than the optimization algorithm. In addition to the change in step size, the signal's reversion to '0' results in the optimization algorithm being changed from the a normalized least square algorithm 302 to the normalized sign algorithm 304. A reset signal 308 may be used to initialize the system and/or reset the system to a default value, e.g., using NLMS 304 as a default and/or using an initial step size.

Figure 4:
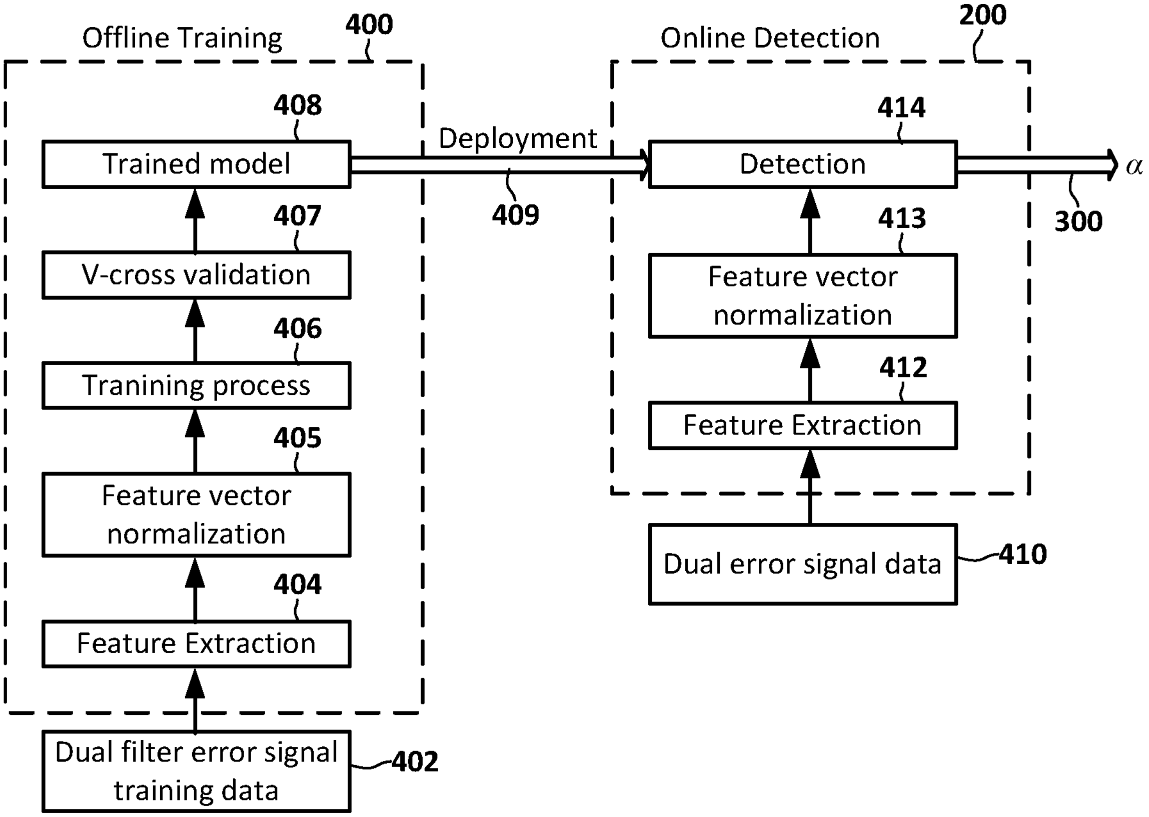
FIG. 4 is a block diagram of an instability detector according to an example embodiment.

In FIG. 4, a block diagram shows details of the learning-based stability detector 200 according to an example embodiment. As the stability detector 200 utilizes machine learning, it will be created using an offline training procedure 400, which typically occurs on a device (e.g., computer) different from the target device (e.g., hearing device). The offline training procedure uses training data 402 that may include at least some representative audio signals, either real-world or simulated. Note that the training data includes dual filter error signals from a foreground and background filter. These filters are described in greater detail below. In some embodiments, the training data may include pre-defined classification labels (e.g., classifications that are pre-assigned to the training data by a human) that indicate whether the training data signals are stable or unstable, or at least relate to an event known to induce instability/stability of a feedback canceller. Details of possible training data are described elsewhere below, but for these purposes it may be assumed that the training data 402 is sufficient to train a machine learning model 408 to detect instability in real-world conditions.

A feature extraction process 404 extracts features from the signal 402, which may be obtained from a frequency-domain or time-domain representation of the signal data stream 402. These may be a combination of power-dependent and power-independent features, as will be described in greater detail elsewhere below. These features are normalized 405 into a vector suitable for the machine learning model. A training process 406 generally involves inputting the feature vectors into an initialized machine-learning model. In some embodiments (e.g., Gaussian mixture model, support vector machine) the training process involves classifying the signals (or parts thereof) into groups/classes. In other embodiments, e.g., neural networks, the training process calculates differences between the output of the model compared to the predefined classification data, and adjusts the model parameters to minimize the differences, e.g., using stochastic gradient descent. The training process 406 may continue iteratively until a condition is met, e.g., classification errors are sufficiently low, classification errors do not further decrease, etc.

One a preliminary trained model is formed, a validation 407 is performed, typically with training data that is not part of the original set 402. This can be used to verify performance of the model and/or additionally refine the model. After validation 407, a trained model 408 is established. The trained model 408 contains data (e.g., parameters, weights) that can be deployed 409 as a detection model 414 that is stored and operated on a hearing device. In the hearing device, an operational error signal data stream 410 is fed into a feature extractor 412 and feature vector normalization 413, which is then processed by the detection module 414, which outputs the control signal 300, which is used as shown in FIG. 3.

The stability detector 200 shown in FIG. 4 aims to identify significant feedback path changes with high sensitivity, high specificity and low detection delay. The stability detector 200 performs feedback path instability as a classification task employing Gaussian mixture models, state vector machines, decision trees, neural networks, etc. The stability detector 200 can significantly improve convergence and re-convergence rate due to perturbations, e.g., resulting in a shorter howling period and less chirping. The stability detector 200 can also allow a lower average misalignment and a larger added stable gain compared to using the existing NLMS method alone.

Figure 5:
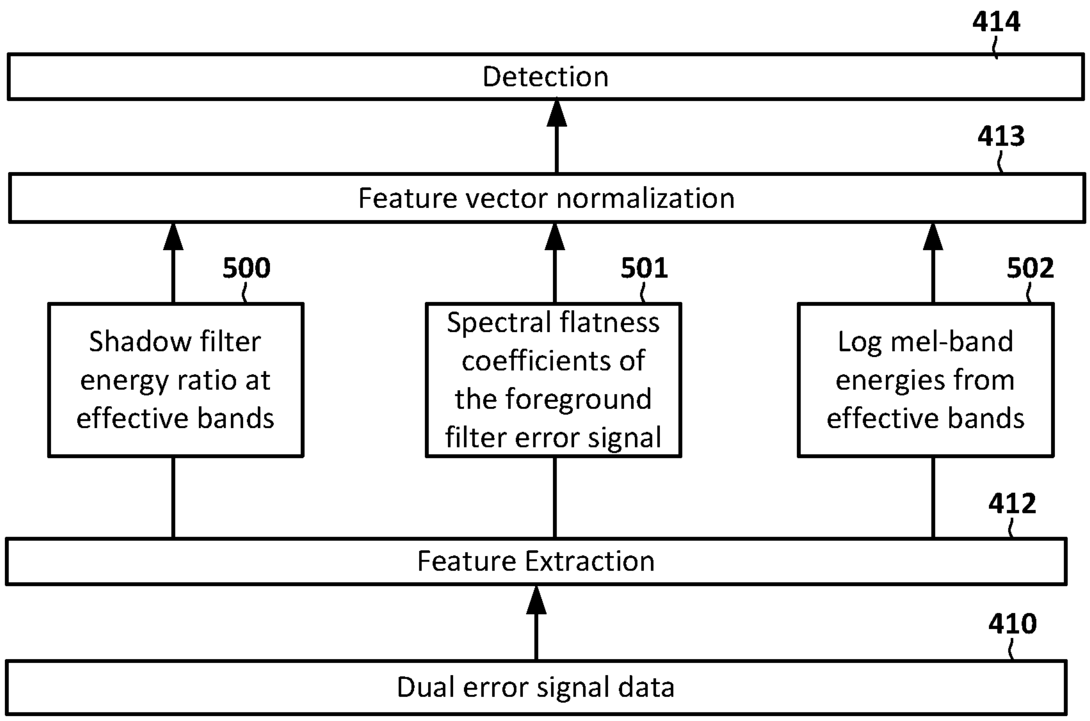
FIG. 5 is a diagram showing error signal features used by an instability detector according to an example embodiment.

The feature extractor 412 can extract at least two features from the error signal data 410. In an embodiment shown in FIG. 5, three features 500-502 from the error signal data are used, which may be obtained from foreground and background adaptive filters. Feature 500 is a shadow filter energy ratio between foreground and background filters at effective bands. Generally, the feedback detection systems may utilize two adaptive filters, a foreground filter that and a background filter. The filter 204 shown in FIGS. 2 and 3 is arranged as a foreground filter, being designed to quickly adapt to changes in the feedback path at to insert feedback cancellation signal $\hat{y}(n)$ into the input signal. A background filter, which is not shown in these figures, operates independently of the foreground filter 204 and is used to provide additional data to the feedback cancellation system.

Figure 9:
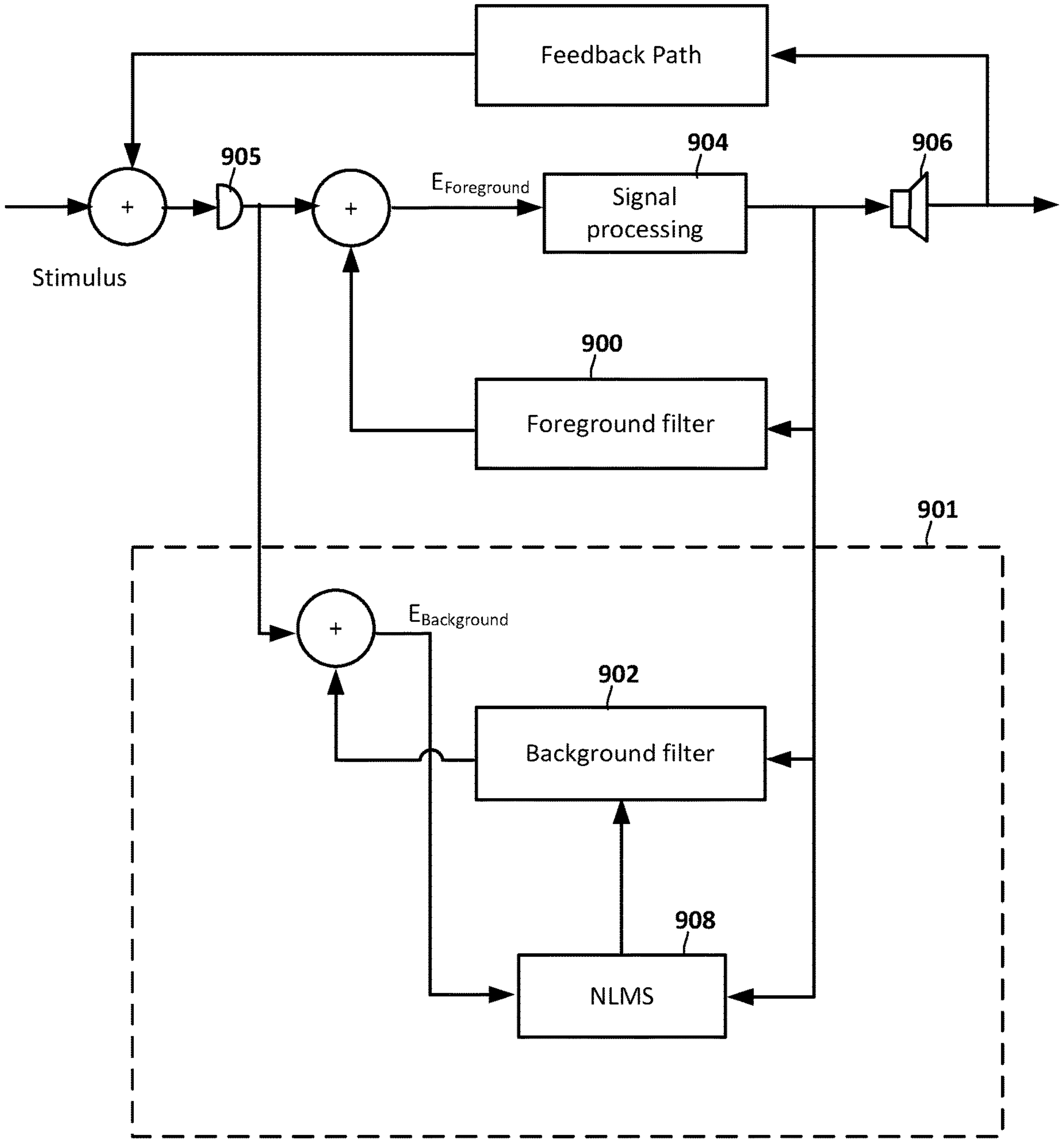
FIG. 9 is a diagram showing background and foreground filters according to an example embodiment.

In FIG. 9, a diagram shows an example of how background and foreground filters 900, 902 may be arranged according to an example embodiment. Generally, the output of the foreground filter 900 is inserted in the signal processing path 904 between the microphone 905 and receiver 906. As noted above, the step size of the foreground filter 900 can be changed based on feedback instability detection, and the step size may be initialized to a value $\mu_0$. In contrast, the output of the background filter 902 is combined with the microphone input signal, the combination then being fed back to the background filter 902 via NLMS algorithm 908. The background filter 902 will have a fixed step size that is relatively large (e.g., $15^*\mu\_0$) compared to the initialized step size of the foreground filter 900. Generally, the background filter 902 acts a shadow filter 901 that can detect and correct undesirable behavior of the foreground filter 900.

The shadow-filter (dual-filter) structure shown in FIG. 9 combines the advantages of the fast and slowly adapting filter as the background (shadow) filter 902 converges faster than the foreground filter 900 hence, produces a better feedback path estimate (e.g., smaller errors). The error signals of the background filter and the foreground filter in each frequency band are calculated as in Equations (1) and (2), where $\alpha_1$ is the smoothing factor based on the smoothing time constant and $E\_fore(k)$ is the complex foreground error signal from the FFT analysis at the $k^{th}$ band. It is suggested to use the bands that correspond to around 2000 Hz 4500 Hz where the feedback paths are generally significant. The feature signal of dual-filter error data is calculated as shown in Equation (3), where n1 and n2 denote the index of the frequency subband with the center frequency of 2000 Hz and 4500 Hz, respectively. As noted above, set the step sizes of the fast adapting background filter can be up to 15 times larger than the initialized step size of the adapting foreground canceller, although may be more in some embodiments, e.g., up to 20 times.

$$Err\_fore_{k(n)}=Err\_fore_{k(n-1)}+\alpha\_1*((E\_fore(k)\cdot*\mathrm{conj}(E\_fore(k))-Err\_fore_{k(n-1)}) \quad (1)$$

$$\alpha\_1*((E\_back(k)\cdot*\mathrm{conj}(E\_back(k))-Err\_backk_{(n-1)}) \quad (2)$$

$$\mathrm{Shadow\_error}(n)=20\log 10(\|Err\_back_{[n1:n2](n)}\|/\|Err\_fore_{[n1:n2](n)}\|) \quad (3)$$

In reference again to FIG. 5, the shadow filter energy ratio at effective bands as shown in Equation (3) can be used as a feature 500 that is input to the instability detector 414. Feature 501 includes spectral flatness coefficients of the foreground filter error signal. Spectral flatness provides a way to quantify how noise-like a sound is, as opposed to being tone-like. A high spectral flatness (approaching 1.0 for white noise) indicates that the spectrum has a similar amount of power in all spectral bands. This would sound similar to white noise, and the graph of the spectrum would appear relatively flat and smooth. In contrast, a small value of spectral flatness (approaching 0) indicates that the spectrum has outliers of power in certain narrow spectral bands—this would sound quite similar to chirpings and whoops, and the graph of the spectrum would appear significantly peaky. In this study, the spectral flatness of the error signal is calculated as in Equation (4), where skis the auto-power spectral density (auto-PSD) value of error signal at bin k, $b_1$ and $b_2$ are the band edges, in bins, over which to calculate the power spread.

$$\mathrm{flatness}=\frac{\left(\prod_{k=b_1}^{b_2} s_k\right)^{\frac{1}{b_2-b_1}}}{\frac{1}{b_2-b_1}\sum_{k=b_1}^{b_2} s_k} \quad (4)$$

For the auto PSD, Skis calculated by recursive smoothing of the short-term power of error signals. This is shown in Equation (5), where $\mathrm{alpha}_1$ is the smoothing factor based on the smoothing time constant and $\mathrm{errSignal}_k$ is the complex error signal from the FFT-analysis at the kth band. Once again, this calculation may use the bands that correspond to around 2000 Hz~4500 Hz where the feedback paths are generally significant.

$$s_k(n)=s_{k(n-1)}+\mathrm{alpha}_1*[\{\mathrm{errSignal}_k*\mathrm{conj}(\mathrm{errSignal}_k)\}-s_{k(n-1)}] \quad (5)$$

Feature 502 includes log mel-band energies from effective bands. Log mel-band energies have been used for single channel sound event detection and have proven to be good features for this purpose. In the proposed system log mel-band energies can be extracted from the foreground filter error signal. Note that the features 500 and 501 being ratios are power-level-independent features (e.g., independent of the average PSD of the error signal), while feature 502 will generally increase or decrease with the average PSD of the signal.

In reference again to FIG. 4, there are a number of ways that training data can be generated. For example, the feedback path can be measured in the real-world on real subjects. In this example, the subjects are asked to conduct various physical activities that could potentially lead to significant feedback path changes, e.g., moving a phone close to and far away from the ear, sneezing, standing up and sitting down, etc. The measured feedback paths include the path changes due to physical activities and can be manually labeled for training purpose.

However, this data collection scheme may have drawbacks. For example, the dynamic feedback paths are cumbersome and time-consuming to measure in practice, which makes it difficult to achieve a sufficiently large and comprehensive data base. Also, the ground truth labelling of the feedback path change can only be roughly labelled. Further, the subjects' movement behaviors differ from one other and are specific to individuals, therefore the obtained data may not be general to represent the feedback path change given the size of the data samples being relatively small. Given this, a mixture of both real-world measurement of dynamic feedback paths and artificially manipulated feedback path changing data set may be used.

For the manipulated feedback path changing data set, one option is to use existing feedback path databases. Within these databases, it is possible to find a number of individual feedback path responses that are stationary. The feedback path can be manipulated by switching from one response to another non-repetitive one over a short time period (every 2 seconds or so) in a cross-validation arrangement. This enables creating a large number feedback path change paths compared to the number of individual feedback path change events. The artificially manipulated feedback path changing data set can be mixed with real-world measurement data. Let β be the percentage ratio of how much the real-world measurement of dynamic feedback path response samples being weighted in the overall training set, e.g., β can be 25%, 50%, 75%, up to 100%.

In reference again to FIG. 5, power-level independent features (e.g., 500 and 501) are those features that do not vary with different input levels and hearing loss insertion gain levels (assuming ideal linearity). Feature 502 can vary with input level and insertion gain. Including both power-level-dependent and power-level-independent features for training and use can lead to a more environment-robust feedback path instability in real-world scenarios and can adapt to various users with different hearing-loss profiles. This can be used to devise to three different training schemes with three feature sets, e.g., features 500-502, features 500, 502, and features 501 and 502. Combining this with various values of β, multiple trained models can be used for online detection with various settings.

Figure 6:
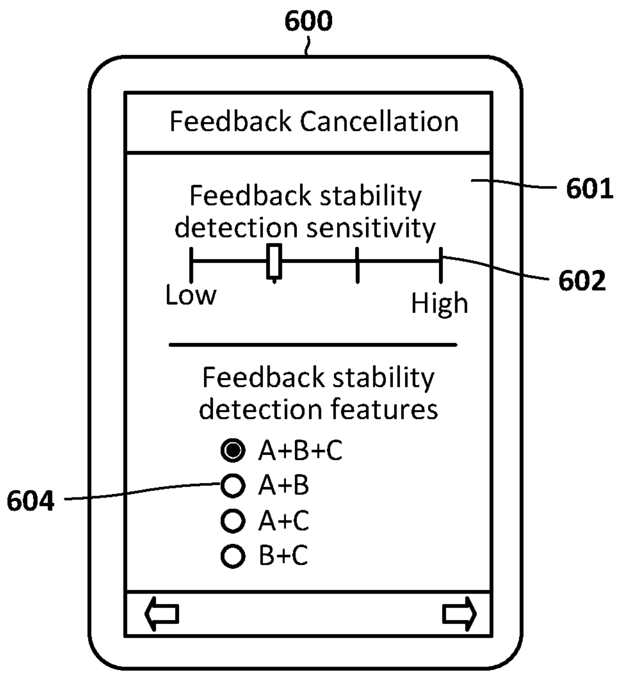
FIG. 6 is a diagram of a user interface usable for setting feedback cancelling settings according to an example embodiment.

In FIG. 6, a diagram illustrates a user interface 601 that may be used with a hearing device according to an example embodiment. This user interface 601 may be deployed on an application operating on a smartphone 600 or similar device. The application may be connected to the hearing devices (e.g., via a wireless connection such as Bluetooth), allowing users to set feedback cancellation parameters in real-time and in real-world. In this way, the user can rate the score of listening experience in terms of sound quality, the frequency of sound chirping, the severity of chirping due to physical movement, etc. The application can record these data and corresponding trained model number, combining with time stamps, GPS locations, acoustic environment classification labels, etc. This information will enable the audiologist or the hearing device manufacturer to identify detections models and parameters that fits goals for selected individuals.

In FIG. 6, the user interface 601 includes a slider 602 that can be used to set a threshold used by the update filter. For example, as seen in FIG. 3, the update filter 208 uses a binary control value 308 of '0' or '1.' In other embodiments, the stability detector could provide an analogous control value α that is a real number between 0.0 and 1.0. The update filter in that embodiment could use a threshold value τ (e.g., τ=0.5) to determine whether to change step size, e.g., NMLS algorithm 302 is chosen if α>τ and NSA algorithm 304 is chosen if $\alpha \leq \tau$. The value of the threshold $\tau$ could be changed manually via slider 602 shown in FIG. 6.

The user interface 601 is also shown with radio buttons 604 that allows selecting which features (e.g., features 500-502 in FIG. 5) are used for the stability detector. In this example, a combination of two or three of the existing features can be chosen, although in other embodiments a single feature could be selected. Note that providing selection of different input features using a control such as radio buttons 604 would involve training and deploying a number of trained models (e.g., similar to detection model 414 in FIG. 5). Each of the trained models would accept one of the different combinations of features as inputs.

A simulation was performed using a feedback cancellation arrangement as shown above. The simulation used real-world measured feedback paths and confirmed clear improvements. There was an added stable gain improvement of 4.5 dB in steady state (no path change). There was 33% less instance of negative gain margin than existing baseline, indicating that the risks of having chirps are significantly lower. The simulation observed 8% less severe chirpings (gain margin streaks <−10 dB) than baseline method during path change.

Figure 7:
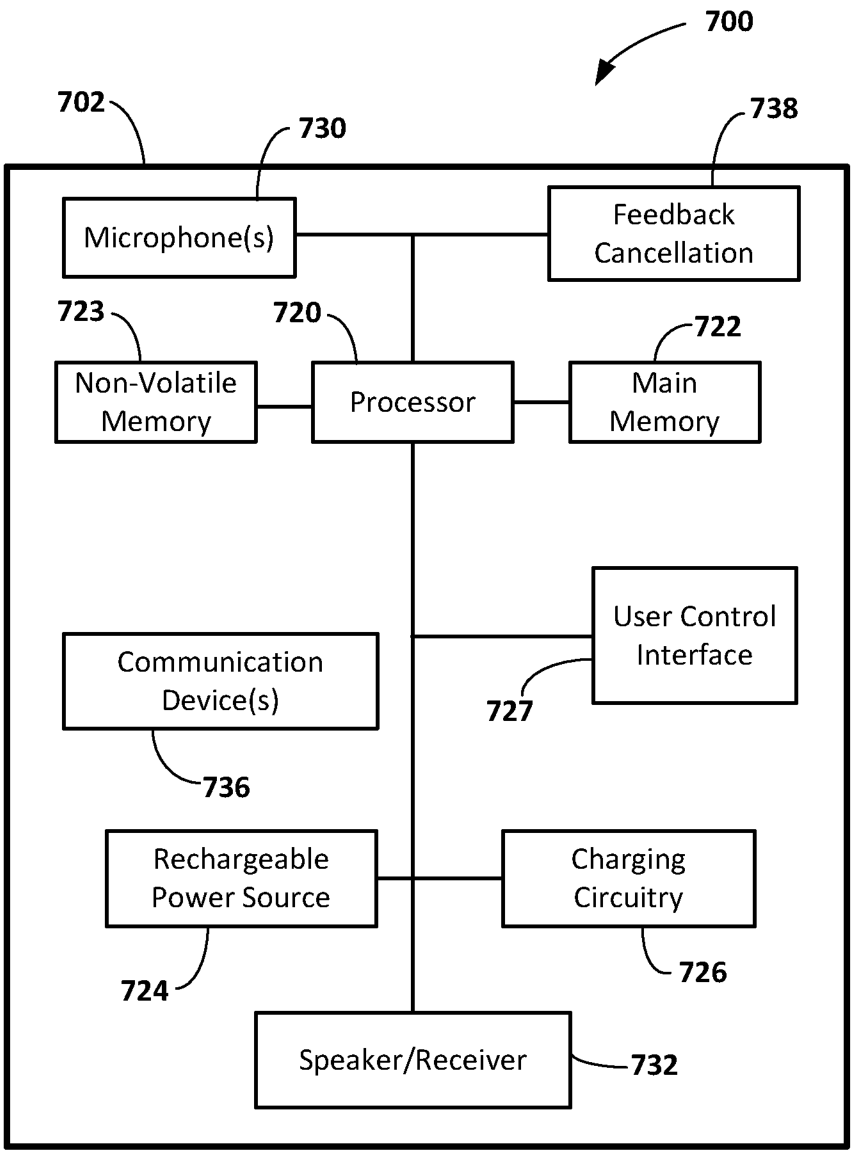
FIG. 7 is a block diagram of a hearing device according to an example embodiment.

In FIG. 7, a block diagram illustrates an ear-worn electronic device 700 in accordance with any of the embodiments disclosed herein. The hearing device 700 includes a housing 702 configured to be worn in, on, or about an ear of a wearer. The hearing device 700 shown in FIG. 7 can represent a single hearing device configured for monaural or single-ear operation or one of a pair of hearing devices configured for binaural or dual-ear operation. The hearing device 700 shown in FIG. 7 includes a housing 702 within or on which various components are situated or supported. The housing 702 can be configured for deployment on a wearer's ear (e.g., a behind-the-ear device housing), within an ear canal of the wearer's ear (e.g., an in-the-ear, in-the-canal, invisible-in-canal, or completely-in-the-canal device housing) or both on and in a wearer's ear (e.g., a receiver-in-canal or receiver-in-the-ear device housing).

The hearing device 700 includes a processor 720 operatively coupled to a main memory 722 and a non-volatile memory 723. The processor 720 can be implemented as one or more of a multi-core processor, a digital signal processor (DSP), a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 720 can include or be operatively coupled to main memory 722, such as RAM (e.g., DRAM, SRAM). The processor 720 can include or be operatively coupled to non-volatile memory 723, such as ROM, EPROM, EEPROM or flash memory. As will be described in detail hereinbelow, the non-volatile memory 723 is configured to store instructions that facilitate using a feedback path stability detector in order to change the operation of a feedback cancellation filter.

The hearing device 700 includes an audio processing facility operably coupled to, or incorporating, the processor 720. The audio processing facility includes audio signal processing circuitry (e.g., analog front-end, analog-to-digital converter, digital-to-analog converter, DSP, and various analog and digital filters), a microphone arrangement 730, and a speaker or receiver 732. The microphone arrangement 730 can include one or more discrete microphones or a microphone array(s) (e.g., configured for microphone array beamforming). Each of the microphones of the microphone arrangement 730 can be situated at different locations of the housing 702. It is understood that the term microphone used herein can refer to a single microphone or multiple microphones unless specified otherwise.

The hearing device 700 may also include a user interface with a user control interface 727 operatively coupled to the processor 720. The user control interface 727 is configured to receive an input from the wearer of the hearing device 700. The input from the wearer can be any type of user input, such as a touch input, a gesture input, or a voice input. The user control interface 727 may be configured to receive an input from the wearer of the hearing device 700 to change feedback cancellation parameters of the hearing device 700, such as shown in FIG. 6. The user control interface 727 may also be used to enable or disable stability detection.

The hearing device 700 also includes a feedback cancellation module 738 operably coupled to the processor 720. The feedback cancellation module 738 can be implemented in software, hardware, or a combination of hardware and software. The feedback cancellation module 738 can be a component of, or integral to, the processor 720 or another processor (e.g., a DSP) coupled to the processor 720. The feedback cancellation module 738 is configured to detect and cancel feedback in different types of acoustic environments.

According to various embodiments, the feedback cancellation module 738 includes an adaptive filter that inserts a feedback cancellation signal into a digitized input signal to produce an error signal. The feedback cancellation module 738 includes or is coupled to an instability detector configured to extract two or more features from the error signal. The instability detector includes a machine learning module that determines instability in the error signal based on the two or more features. The instability module changes a step size of the adaptive filter in response to determining the instability. The changed step size causes the adaptive filter to have a faster adaptation to perturbations in the error signal.

The hearing device 700 can include one or more communication devices 736 coupled to one or more antenna arrangements. For example, the one or more communication devices 736 can include one or more radios that conform to an IEEE 802.11 (e.g., WiFi®) or Bluetooth® (e.g., BLE, Bluetooth® 4. 2, 5.0, 5.1, 5.2 or later) specification, for example. In addition, or alternatively, the hearing device 700 can include a near-field magnetic induction (NFMI) sensor (e.g., an NFMI transceiver coupled to a magnetic antenna) for effecting short-range communications (e.g., ear-to-ear communications, ear-to-kiosk communications).

The hearing device 700 also includes a power source, which can be a conventional battery, a rechargeable battery (e.g., a lithium-ion battery), or a power source comprising a supercapacitor. In the embodiment shown in FIG. 5, the hearing device 700 includes a rechargeable power source 724 which is operably coupled to power management circuitry for supplying power to various components of the hearing device 700. The rechargeable power source 724 is coupled to charging circuitry 726. The charging circuitry 726 is electrically coupled to charging contacts on the housing 702 which are configured to electrically couple to corresponding charging contacts of a charging unit when the hearing device 700 is placed in the charging unit.

Figure 8:
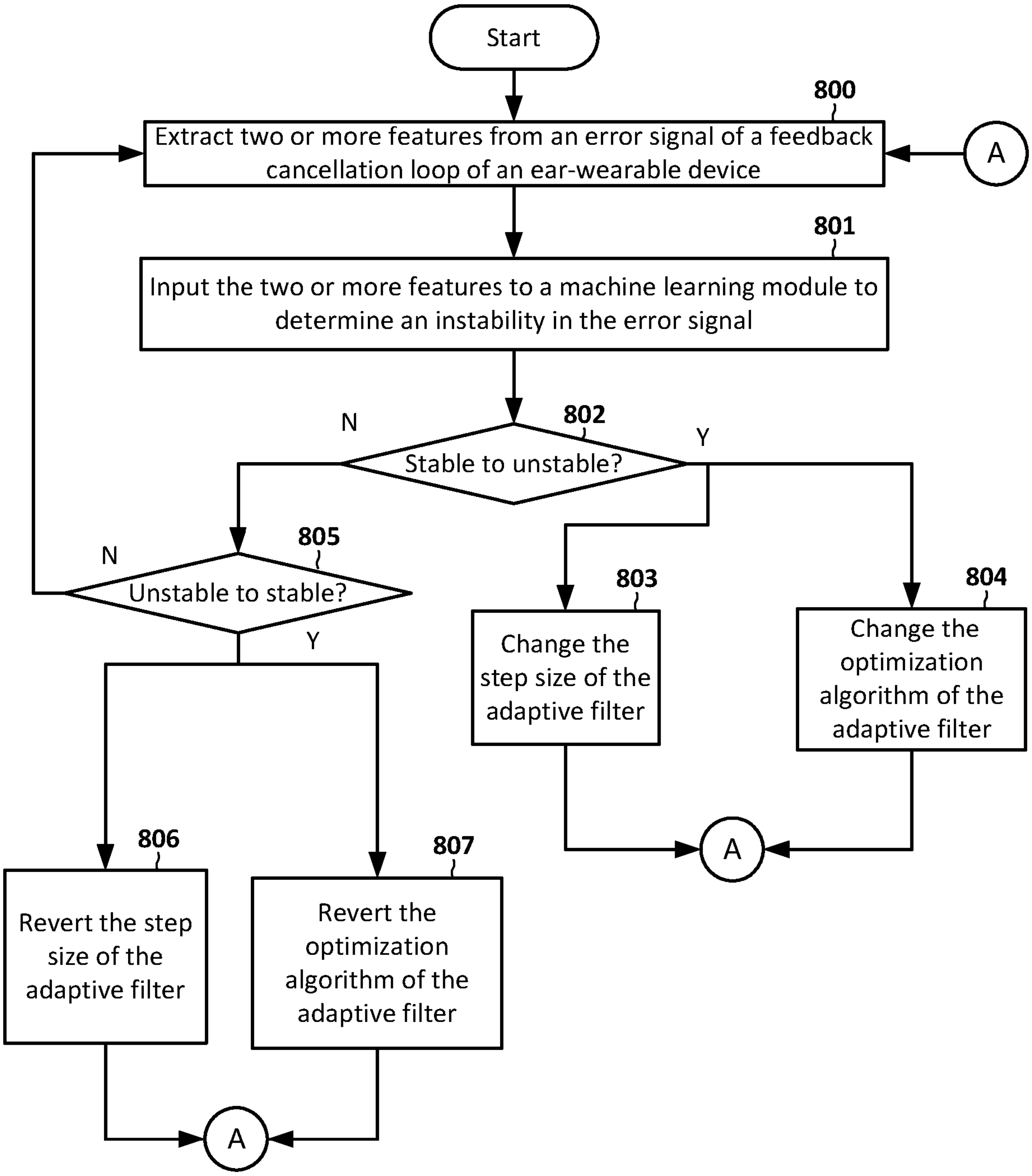
FIG. 8 is a flowchart of a method according to an example embodiment.

In FIG. 8, a flowchart shows a method according to an example embodiment.

Generally, the method can be implemented within an infinite loop in a hearing device. The method involves extracting 800 two or more features from an error signal of a feedback cancellation loop of an ear-wearable device. For example, the two or more features may include at least one power-level-dependent feature and at least one power-level-independent feature. The two or more features are input 801 to a machine learning module to determine an instability in the error signal. At block 802, it is determined whether the machine learning module detects a change from a stable to unstable state of the feedback path or other factors that can affect the ability to perform feedback cancellation.

If a change 802 from stable to unstable is detected, then one or both of blocks 803, 804 may be performed. Block 803 involves changing a step size of an adaptive filter used to cancel feedback in the ear-wearable device in response to determining the instability. The change in step sized cause to the adaptive filter to have a faster adaptation to perturbations in the error signal compared to a previously used step size. Block 804 involves changing an optimization algorithm of the adaptive filter, the changed optimization algorithm having a faster adaptation to perturbations in the error signal.

If block 802 returns 'no' then another decision block 805 determines if whether the machine learning module detects a change from an unstable to stable state of the feedback path/environment. If a change 805 from unstable to stable is detected, then one or both of blocks 806, 807 may be performed. Block 803 involves reverting the step size of the adaptive filter to a previously used value, the previously used step size resulting in the adaptive filter having a lower sensitivity to the perturbations than the changed step size. Block 804 involves reverting to a previously used optimization algorithm of the adaptive filter, the previously used optimization algorithm having a lower sensitivity to the perturbations than the algorithm selected at block 804. Note that while some of blocks 803, 804, 806, and 807 are described as being optional, if the operation described in block 803 is used, then the operation described in block 806 will also generally be performed as appropriate. A similar dependency may exist between blocks 804 and 807.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An ear-wearable device, comprising:

an input sensor that provides an input signal, the input signal being digitized via circuitry of the ear-wearable device;

an adaptive feedback canceller comprising an adaptive foreground filter that inserts a feedback cancellation signal into the digitized input signal to produce an error signal; and an instability detector configured to extract two or more features from the error signal, the instability detector comprising a machine learning module that determines an instability in the error signal based on the two or more features, the instability in the error signal being due to at least one of: a sudden change in a feedback path of the ear-wearable device, or a transition between stationarity periods of the input signal leading to outliers in the error signal;

the instability detector changing a step size of the adaptive foreground filter in response to determining the instability, the changed step size causing the adaptive foreground filter to have a faster adaptation to perturbations in the error signal compared to a previously used step size.

2. The ear-wearable device of claim 1, wherein the two or more features comprise a power-level-dependent feature and a power-level-independent feature, and wherein the power-level-independent feature comprises at least one of a spectral flatness of the adaptive foreground filter or an energy ratio of an error signal of a background filter to the error signal of the adaptive foreground filter.

3. The ear-wearable device of claim 2, wherein the background filter has a constant faster adaptation speed than the adaptive foreground filter.

4. The ear-wearable device of claim 2, wherein a step size of the background filter is up to 15 times that of an initial step size of the adaptive foreground filter.

5. The ear-wearable device of claim 2, wherein the power-level dependent feature comprises at least one of average power spectral densities of selective bands of the error signal or log mel-band energies of selective bands of the error signal.

6. The ear-wearable device of claim 1, wherein changing the step size of the adaptive foreground filter further comprises changing between an optimization algorithm of the adaptive foreground filter.

7. The ear-wearable device of claim 6, wherein the optimization algorithm is changed from a normalized sign algorithm to a normalized least square algorithm in response to determining the instability.

8. The ear-wearable device of claim 7, further operable to, after changing from the normalized sign algorithm to the normalized least square algorithm, determining stability of the error signal, and in response thereto, reverting to the normalized sign algorithm.

9. The ear-wearable device of claim 1, further operable to, after changing the step size of the adaptive filter, determine stability of the error signal via the instability detector, and in response thereto, revert to the previously used step size of the adaptive filter, the previously used step size resulting in the adaptive foreground filter having a lower sensitivity to the perturbations than the changed step size.

10. The ear-wearable device of claim 1, wherein the machine learning module comprises a Gaussian mixture model.

11. A method comprising:

extracting two or more features from an error signal of a feedback cancellation loop of an ear-wearable device, the two or more features comprising a power-level-dependent feature and a power-level-independent feature;

inputting the two or more features to a machine learning module to determine an instability in the error signal, the instability in the error signal being due to at least one: of a sudden change in a feedback path of the ear-wearable device; or a transition between stationarity periods of the input signal leading to outliers in the error signal; and changing a step size of an adaptive foreground filter used to cancel feedback in the ear-wearable device in response to determining the instability, the changed step size causing the adaptive foreground filter to have a faster adaptation to perturbations in the error signal compared to a previously used step size.

12. The method of claim 11, wherein the power-level-dependent feature comprises average power spectral densities of selective bands of the error signal.

13. The method of claim 11, wherein the power-level-independent feature comprises an error signal energy ratio of a background filter to the adaptive foreground filter.

14. The method of claim 13, wherein a step size of the background filter is up to 15 times that of an initial step size of the adaptive foreground filter.

15. The method of claim 13, wherein background filter has a constant faster adaptation speed than the adaptive foreground filter.

16. The method of claim 13, wherein the power-level-independent feature further comprises a spectral flatness of the adaptive foreground filter.

17. A method comprising:

extracting two or more features from an error signal of a feedback cancellation loop of an ear-wearable device, the two or more features comprising a power-level-dependent feature and a power-level-independent feature;

inputting the two or more features to a machine learning module to determine an instability in the error signal, the instability in the error signal being due to at least one of: a sudden change in a feedback path of the ear-wearable device, or a transition between stationarity periods of the input signal leading to outliers in the error signal; and changing an optimization algorithm of an adaptive foreground filter used to cancel feedback in the ear-wearable device in response to determining the instability, the changed optimization algorithm having a faster adaptation to perturbations in the error signal compared to a previously used optimization algorithm.

18. The method of claim 17, wherein the power-level-dependent feature comprises at least one of average power spectral densities of selective bands of the error signal or log mel-band energies of selective bands of the error signal.

19. The method of claim 17, wherein the power-level-independent feature comprises at least one of an error signal energy ratio of a background filter to the adaptive foreground filter or a spectral flatness of the adaptive foreground filter.

* * * * *